3,309,383
PROCESS AND INTERMEDIATES FOR MANUFACTURE OF 16-OXA STEROIDS

Raphael Pappo, Skokie, Ill., assignor to G. D. Searle & Co., Chicago, Ill., a corporation of Delaware
No Drawing. Filed Feb. 17, 1966, Ser. No. 528,104
14 Claims. (Cl. 260—343.3)

The present invention is concerned with a novel process and novel intermediates useful for the manufacture of 16-oxa steroids and the corresponding hydroxy acids. The 16-oxa steroids and hydroxy acids especially contemplated are hypocholesterolemic agents which possess the particular advantage of lacking estrogenic side-effects and are represented by the following structural formulas

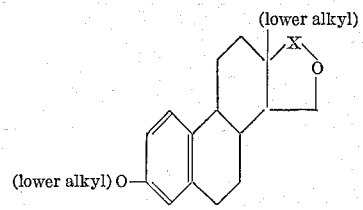

and

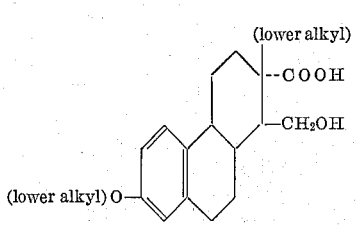

wherein X is a carbonyl, hydroxymethylene or (lower alk)-oxymethylene radical.

The lower alkyl radicals encompassed in the foregoing structural representation are methyl, ethyl, propyl, butyl, pentyl, hexyl, heptyl and the branched-chain groups isomeric therewith.

In the initial step of the instant process, a 6-(lower alkoxy)-1-vinyl-1-tetralol represented by the following structural formula

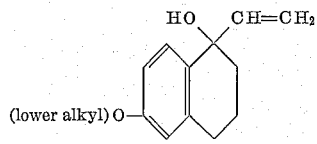

is contacted with a 2-(lower alkyl)-4-oxacyclopentane-1,3-dione of the following structural formula

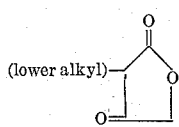

optionally in the presence of an alkaline catalyst to afford an intermediate illustrated by the formula

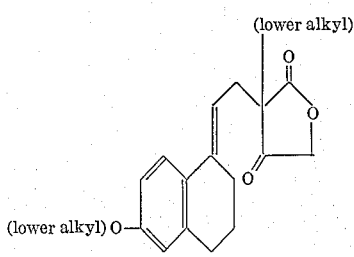

Alkaline catalysts particularly suitable for this purpose are strongly basic organic tertiary amines such as triethylamine and inorganic alkalies such as sodium hydroxide and potassium hydroxide. A specific example of that procedure is the reaction in toluene solution of 6-methoxy-1-vinyl-1-tetralol with 2-methyl-4-oxacyclopentane-1,3-dione in the presence of triethylamine at the reflux temperature of the mixture to afford 2-methyl-2-(6-methoxy-1-naphthyliden)ethyl - 4 - oxacyclopentane-1,3-dione.

The latter tricyclic intermediates are cyclized to the corresponding tetracyclic derivatives of the following structural formula

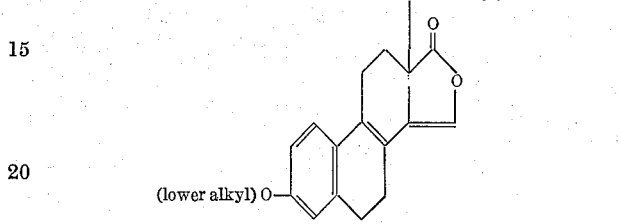

by heating in an inert organic solvent medium in the presence of a strong acid catalyst. The aforementioned 2-methyl-2-(6-methoxy-1-naphthyliden)ethyl - 4 - oxacyclopentane-1,3-dione is thus refluxed in benzene solution in the presence of p-toluenesulfonic acid to yield 3-methoxy-16-oxaestra-1,3,5(10),8(9),14-pentaen-17-one.

Selective reduction of the 14(15) double bond of the latter pentaenes is suitably effected by catalytic hydrogenation, thus providing the corresponding tetraenes represented by the following formula

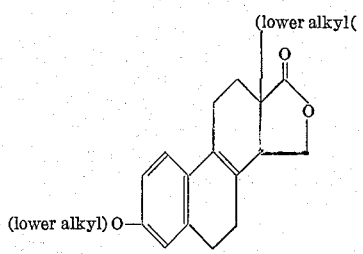

That process is specifically illustrated by the hydrogenation, at atmospheric pressure and room temperature, of 3-methoxy-16-oxaestra-1,3,5(10),8(9),14 - pentaen - 17-one, in the presence of a catalytic quantity of 5% palladium-on-carbon, to afford 3 - methoxy - 16 - oxaestra-1,3,5(10),8(9)-tetraen-17-one.

The lactone ring of the latter intermediates is conveniently opened by reaction in aqueous medium with an alkali metal hydroxide or suitable weak acid salt to afford the corresponding hydroxy acid alkali metal salts illustrated below:

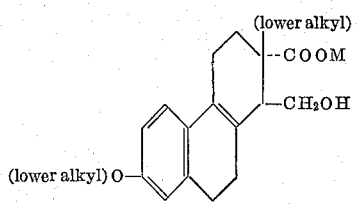

wherein M is an alkali metal cation. When 3-methoxy-16-oxaestra-1,3,5(10),8(9)-tetraen-17-one is heated with sodium carbonate in aqueous methanol the sodium salt of trans-2-carboxy-1-hydroxymethyl-2-methyl - 1,2,3,4,9,10-hexahydrophenanthren-7-ol 7-methyl ether is obtained. The 4a(10a) double bond of the latter alkali metal salts or of the corresponding free hydroxy acids is preferentially reduced when those intermediates are contacted with an alkali metal and liquid ammonia, optionally in the presence of aniline, thus producing intermediates of the following formula

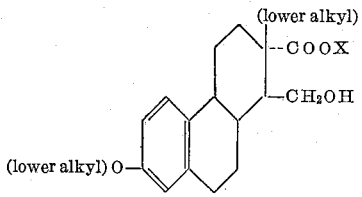

wherein X is hydrogen or an alkali metal cation. The sodium salt of *trans*-2-carboxy - 1 - hydroxymethyl - 2-methyl-1,2,3,4,9,10-hexahydrophenanthren-7-ol 7-methyl ether is thus stirred with metallic sodium and liquid ammonia containing aniline to yield, after acidification, *trans* - 2 - carboxy - 1 - hydroxymethyl - 2 - methyl-1,2,3,4,4a,9,10,10a-octahydrophenanthren-7-ol 7 - methyl ether.

Cyclization of the latter hydroxy acids to afford the desired 16-oxa compounds of the following formula

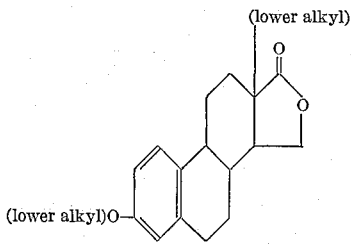

is readily effected by heating in an inert organic solvent medium in the presence of an acid catalyst. The process is exemplified by the heating of *trans*-2-carboxy-1-hydroxy-methyl - 2 - methyl-1,2,3,4,4a,9,10,10a-octahydrophenanthren-7-ol 7-methyl ether together with p-toluenesulfonic acid to produce 3 - methoxy - 16 - oxaestra-1,3,5(10)-trien-17-one.

The 3-(lower alkoxy)-13β-(lower alkyl)-16-oxagona-1,3,5(10),8(9),14-pentaen-17-ones described above are alternatively contacted with an alkali metal hydroxide or suitable weak acid salt to afford, after acidification, aldehydo-acids of the following formula

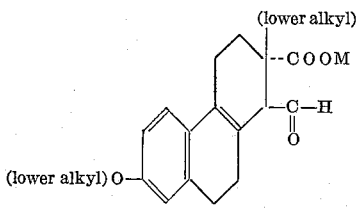

A specific illustration is the reaction of 3-methoxy-16-oxaestra-1,3,5(10),8(9),14-pentaen - 17 - one with potassium carbonate in aqueous ethanol to yield the potassium salt of *trans* - 2 - carboxy-1-formyl-2-methyl-1,2,3,4,9,10-hexahydrophenanthren-7-ol 7-methyl ether. Reduction of those aldehydo-acids with a suitable reducing agent affords the above described hydroxy acids of the following formula

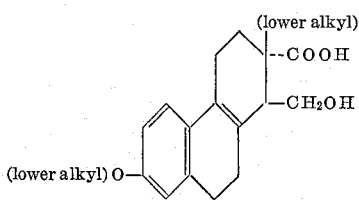

which are converted to the corresponding 16-oxaestra-1,3,5(10)-trien-17-ones as described hereinbefore.

An additional alternative variation in the present process involves reduction of the 17-keto group of the aforementioned 3-(lower alkoxy)-13β-(lower alkyl)-16-oxagona-1,3,5(10),8(9)-tetraen-17-ones to yield the corresponding 17-ols, etherification of the 17-hydroxy group by reaction with a lower alkanol in the presence of an acid catalyst and reduction of the 8(9) double bond by the alkali metal-liquid ammonia-aniline method described hereinbefore to produce the desired 13β-(lower alkyl)-16 - oxagona - 1,3,5(10)-triene-3,17-diol 3,17-di-(lower alkyl) ethers of the following formula

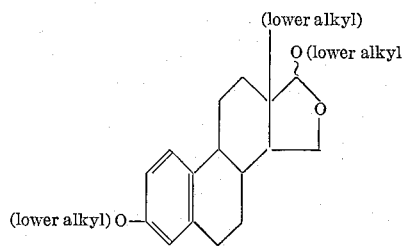

wherein the wavy line indicates the alternative "α" or "β" stereochemical configuration. The 17-(lower alkoxy) group can be cleaved by reaction with a dilute mineral acid in a suitable organic solvent medium to afford the corresponding 17-ols. Those procedures are illustrated by the low temperature reduction of 3-methoxy-16-oxa-estra-1,3,5(10),8(9)-tetraen-17-one with diisobutyl aluminum hydride in toluene, reaction of that 17-ol with methanol in the presence of p-toluenesulfonic acid and reduction of the resulting 17-ol 17-methyl ether by means of sodium and liquid ammonia containing aniline to afford 16 - oxaestra-1,3,5(10)-trien-3,17-diol 3,17-di-methyl ether. Heating of the latter substance with dilute hydrochloric acid in tetrahydrofuran solution yields 3-methoxy-16-oxaestra-1,3,5(10)-trien-17-ol.

The intermediates of the present invention are obtained in the form of their *dl*-mixtures. Those enantiomorphic mixtures can be resolved however by methods known to the art. Those derivatives containing a carboxylic acid group, for example, form salts with optically active amines such as brucine, cinchonine, menthylamine, morphine, quinidine, quinine and strychnine. Fractional crystallization of the resulting diasteriomeric salts followed by regeneration of the free acids affords the individual *d* and *l* enantiomorphs.

The following examples illustrate in further detail some of the compounds which constitute this invention together with methods for their preparation. The invention, however, is not to be construed as limited thereby either in spirit or in scope as many modifications both in materials and methods can be adapted without departing from the invention herein described. In these examples, temperatures are indicated in degrees centigrade (° C.) and quantities of materials in parts by weight unless otherwise noted.

EXAMPLE 1

To a solution of 20.4 parts of 6-methoxy-1-vinyl-1-tetralol in 92 parts of toluene is added successively 10.2 parts of triethylamine and 10 parts of 2-methyl-4-oxacyclopentane-1,3-dione. The resulting reaction mixture is heated at the reflux temperature in a nitrogen atmosphere for about 4 hours, during which time the water of reaction in azeotropically removed. The mixture is then partially concentrated by distillation over a period of about one hour, then is cooled and diluted with benzene. The resulting organic solution is washed successively with 5% aqueous potassium bicarbonate and water, then dried over anhydrous sodium sulfate and distilled to dryness under reduced pressure. The resulting gummy residue is purified by crystallization from isopropyl alcohol-ether to afford *dl*-2-methyl-2-(6-methoxy-1-naphthyliden)ethyl - 4 - oxacyclopentane-1,3-dione, which displays a melting point at about 86–87°. This compound is represented by the following structural formula

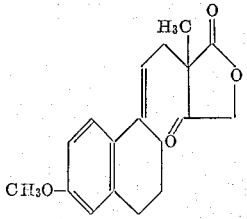

EXAMPLE 2

A mixture containing 4 parts of *dl*-2-methyl-2-(6-methoxy - 1 - naphthyliden)ethyl-4-oxacyclopentane-1,3-dione and 0.1 part of p-toluenesulfonic acid in 106 parts of dry benzene is heated at the reflux temperature for about 15 minutes, in a nitrogen atmosphere, while the water of reaction is mechanically removed. The reaction mixture is then cooled to 0–5°, washed successively with water and aqueous potassium bicarbonate, then dried over anhydrous sodium sulfate. Removal of the solvent by distillation under reduced pressure affords a gummy residue which is crystallized from benzene-ether to yield *dl*-3-methoxy - 16-oxaestra-1,3,5(10),8(9),14-pentaen-17-one, melting at about 151–153°. It can be represented by the following structural formula

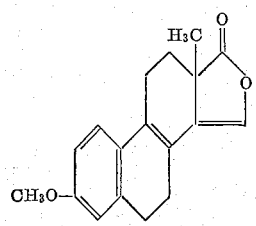

EXAMPLE 3

To a solution of one part of *dl*-3-methoxy-16-oxaestra-1,3,5(10),8(9),14-pentaen-17-one in 132 parts of benzene is added 0.1 part of 5% palladium-on-carbon catalyst, and the resulting mixture is shaken with hydrogen at atmospheric pressure and room temperature until one molecular equivalent of hydrogen has been adsorbed. The mixture is then filtered to remove the catalyst, and the filtrate is concentrated under reduced pressure to afford the crude product. Recrystallization of that solid residue from benzene-ether affords *dl*-3-methoxy-16-oxaestra-1,3,5(10),8(9)-tetraen-17-one, melting at about 139–148°. Two additional recrystallizations from benzene-ether affords the pure material, displaying a melting point at about 156–159°. This compound is illustrated by the following structural formula

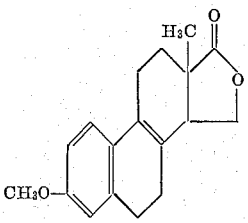

EXAMPLE 4

To a solution of 3.24 parts of *dl*-3-methoxy-16-oxaestra-1,3,5(10),8(9)-tetraen-17-one in 200 parts of methanol is added a solution of 1.43 parts of sodium carbonate in 15 parts of water, and the resulting reaction mixture is heated at the reflux temperature, in a nitrogen atmosphere, for about one hour, then is concentrated to dryness by distillation under reduced pressure. The residual material is extracted with anhydrous methanol, and the insoluble inorganic salts are removed by filtration. Concentration of the filtrate to dryness by distillation under reduced pressure affords the crystalline sodium salt of *dl - trans* - 2-carboxy-1-hydroxymethyl-2-methyl-1,2,3,4,9,10-hexahydrophenanthren-7-ol 7-methyl ether. This compound is represented by the following formula

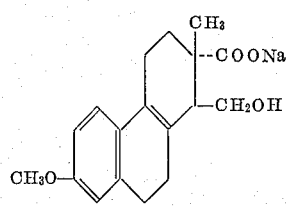

The latter sodium salt is dissolved in water, and the resulting aqueous solution is acidified to pH 2 by the addition of dilute hydrochloric acid. The resulting crystalline precipitate is extracted into chloroform, and the chloroform solution is washed with water, then dried over anhydrous sodium sulfate and evaporated to dryness. Trituration of the resulting residue with benzene affords pure *dl - trans* - 2-carboxy-1-hydroxymethyl-2-methyl-1,2,3,4,9,10-hexahydrophenanthren-7-ol 7-methyl ether, melting at about 187–190° with decomposition.

EXAMPLE 5

To a solution of 2 parts of the sodium salt of *dl-trans*-2-carboxy-1-hydroxymethyl - 2 - methyl - 1,2,3,4,9,10-hexahydrophenanthren-7ol 7-methyl ether in 140 parts of liquid ammonia is added one part of metallic sodium and 13 parts of aniline, and the resulting reaction mixture is stirred for about one hour. Approximately 4 parts of solid ammonium chloride is added, and the solvent is removed by evaporation under nitrogen. The resulting residue is diluted with water, and the aqueous solution thus obtained is washed with benzene, then acidified to pH 5 with cooling, thus affording *dl-trans*-2-carboxy-1-hydroxymethyl - 2 - methyl-1,2,3,4,4a,9,10,10a-octahydrophenanthren-7-ol 7-methyl ether.

EXAMPLE 6

A mixture of one part of *dl-trans*-2-carboxy-1-hydroxymethyl - 2 - methyl - 1,2,3,4,4a,9,10,10a - octahydrophenanthren-7-ol 7-methyl ether, 0.01 part of p-toluenesulfonic acid monohydrate and 264 parts of benzene is distilled until approximately 88 parts of benzene is collected. Cooling of the reaction mixture to room temperature followed by washing with dilute aqueous sodium bicarbonate, and drying over anhydrous sodium sulfate affords an organic solution, which is concentrated to dryness under reduced pressure to afford the solid crude product. Trituration of that residue with ether affords *dl*-3-methoxy-16-oxaestra-1,3,5(10)-trien-17-one, melting at about 163–170°. Recrystallization from benzene-ether yields prismatic crystals of the pure substance, melting at about 173–175°.

EXAMPLE 7

A mixture containing 2.74 parts of *dl*-3-methoxy-16-oxaestra-1,3,5(10),8(9),14-pentaen-17-one, 1.36 parts of potassium carbonate, 120 parts of ethanol and 50 parts of water is heated at the reflux temperature under nitrogen for about 3 hours, then is cooled and concentrated to dryness to afford a mixture of the potassium salts of *dl-trans*-2-carboxy-1-formyl - 2 - methyl-1,2,3,4,9,10-hexahydrophenanthren-7-ol 7-methyl ether and *dl-cis*-2-carboxy-1-formyl-2-methyl - 1,2,3,4,9,10 - hexahydrophenanthren-7-ol 7-methyl ether.

To a solution of one part of sodium borohydride in 50 parts of ethanol is added slowly, with stirring, one part of the latter mixture of potassium salts, and the reaction mixture is diluted with water after the initial reaction subsides. The resulting solution is stirred at room temperature for about 5 hours, then is made acidic by the addition of dilute hydrochloric acid. The precipitate which forms is extracted into chloroform, and the chloroform solution is extracted with dilute aqueous potassium bicarbonate. Evaporation of the organic solution to dryness affords *dl* - 3 - methoxy-16-oxa-14β-estra-1,3,5(10), 8(9)-tetraen-17-one.

Acidification of the potassium bicarbonate extract with dilute hydrochloric acid results in formation of a precipitate which is isolated by filtration to produce *dl-trans*-2-carboxy-1-hydroxymethyl-2-methyl-1,2,3,4,9,10 - hexahydrophenanthren-7-ol 7-methyl ether.

EXAMPLE 8

To a solution of one part of *dl*-3-methoxy-16-oxaestra-1,3,5(10),8(9),14-pentaen-17-one in 70 parts of benzene containing 20 parts of pyridine is added one part of 5% palladium-on-calcium carbonate catalyst, and that mixture is shaken with hydrogen at atmospheric pressure and room temperature until one molecular equivalent of hydrogen has been absorbed. The reaction mixture is then filtered to remove the catalyst, and the filtrate is evaporated to dryness under reduced pressure to afford the crude product. Recrystallization from benzene-ether yields *dl*-3-methoxy-16-oxa-14β-estra - 1,3,5(10),8(9)-trien-17-one, melting at about 134–135°.

EXAMPLE 9

To a solution of 2 parts of *dl*-3-methoxy-16-oxaestra-1,3,5(10),8(9)-tetraen-17-one in 87 parts of dry toluene is added, at −70°, 5.25 parts by volume of a 25% solution of diisobutyl aluminum hydride in toluene. The resulting reaction mixture is stirred at that temperature for about one hour, then is poured carefully, with stirring, into a mixture of 100 parts of water and 200 parts of ice containing 42 parts of acetic acid. The organic layer is separated, washed successively with water and saturated aqueous sodium bicarbonate, dried over anhydrous sodium sulfate and evaporated to dryness under reduced pressure to afford *dl*-3-methoxy-16-oxaestra-1,3,5(10),8(9)-tetraen-17-ol.

EXAMPLE 10

To a solution of 2 parts of *dl*-3-methoxy-16-oxaestra-1,3,5(10),8(9)-tetraen-17-ol in 40 parts of methanol is added 0.05 part of p-toluenesulfonic acid monohydrate. The precipitate which forms is isolated by filtration and dried to afford *dl*-16-oxaestra - 1,3,5(10),8(9)-tetraene-3,17-diol-3,17-dimethyl ether.

EXAMPLE 11

When an equivalent quantity of *dl*-16-oxaestra-1,3,5(10),8(9)-tetraene-3,17-diol 3,17-dimethyl ether is substituted in the procedure of Example 5, there is produced *dl*-16-oxaestra-1,3,5(10) - triene-3,17 - diol 3,17-dimethyl ether.

EXAMPLE 12

A mixture containing 2.5 parts of *dl*-16-oxaestra-1,3,5(10)-triene-3,17-diol 3,17-dimethyl ether, 135 parts of tetrahydrofuran and 50 parts by volume of 0.5 N hydrochloric acid is concentrated to approximately one-half volume by distillation over a period of about 45 minutes. The residual aqueous mixture is neutralized by the addition of dilute aqueous sodium bicarbonate, then is extracted with chloroform. The resulting chloroform solution is dried over anhydrous sodium sulfate, then is stripped of solvent by distillation under reduced pressure to afford *dl*-3-methoxy-16-oxaestra-1,3,5(10)-trien-17-ol.

EXAMPLE 13

When equivalent quantities of 6-ethoxy-1-vinyl-1-tetralol and 2-ethyl-4-oxacyclopentane-1,3-dione are substituted in the procedure of Example 1, there is produced *dl*-2-ethyl-2-(6-ethoxy-1-naphthyliden)ethyl - 4 - oxacyclopentane-1,3-dione.

EXAMPLE 14

When an equivalent quantity of *dl*-2-ethyl-2-(6-ethoxy-1-naphthyliden)ethyl-4-oxacyclopentane-1,3-dione is substituted in the procedure of Example 2, there is produced *dl*-3-ethoxy-13β-ethyl - 16 - oxagona - 1,3,5(10),8(9),14-pentaen-17-one.

EXAMPLE 15

By substituting an equivalent quantity of *dl*-3-ethoxy-13β-ethyl-16-oxagona - 1,3,5(10),8(9),14-pentaen-17-one and otherwise proceeding according to the processes described in Example 3, there is produced *dl*-3-ethoxy-13β-ethyl-16-oxagona-1,3,5(10),8(9)-tetraen-17-one.

EXAMPLE 16

The substitution of an equivalent quantity of *dl*-3-ethoxy - 13β-ethyl-16-oxagona-1,3,5(10),8(9)-tetraen-17-one in the procedure of Example 4 results in the sodium salt of *dl-trans*-2-carboxy-1-hydroxymethyl-2-ethyl-1,2,3,4,9,10-hexahydrophenanthren-7-ol 7-ethyl ether and also the corresponding free hydroxy acid.

EXAMPLE 17

When an equivalent quantity of the sodium salt of *dl-trans*-2-carboxy - 1 - hydroxymethyl-2-ethyl-1,2,3,4,9,10-hexahydrophenanthren-7-ol 7-ethyl ether is substituted in the procedure of Example 5, there is obtained *dl-trans*-2-carboxy-1-hydroxymethyl - 2 - ethyl-1,2,3,4,4a,9,10,10a-octahydrophenanthren-7-ol 7-ethyl ether.

EXAMPLE 18

When an equivalent quantity of *dl-trans*-2-carboxy-1-hydroxymethyl-2-ethyl - 1,2,3,4,4a,9,10,10a - octa-hydrophenanthren-7ol 7-ethyl ether is substituted in the procedure of Example 6, there is obtained *dl*-3-ethoxy-13β-ethyl-16-oxagona-1,3,5(10)-trien-17-one.

EXAMPLE 19

The substitution of an equivalent quantity of 3-ethoxy-13β-ethyl - 16 - oxagona-1,3,5(10),8(9),14-pentaen-17-one in the procedures of Example 7 affords *dl-trans*-2-carboxy - 1 - formyl - 2 - ethyl - 1,2,3,4,9,10-hexahydrophenanthren-7-ol 7-ethyl ether, *dl-cis*-2-carboxy-1-formyl-2-ethyl-1,2,3,4,9,10-hexahydrophenanthren - 7 - ol 7-ethyl ether, *dl*-3-ethoxy-13β-ethyl-16-oxa-14β-gona - 1,3,5(10),8(9) - tetraen-17-one and *dl-trans*-2-carboxy-1-hydroxymethyl - 2 - ethyl-1,2,3,4,9,10-hexahydrophenanthren-7-ol 7-ethyl ether.

EXAMPLE 20

When an equivalent quantity of *dl*-3-ethoxy-13β-ethyl-16-oxagona-1,3,5(10),8(9),14-pentaen-17-one is substituted in the procedure of Example 8, there is produced *dl* - 3 - ethoxy-13β-ethyl-16-oxa-14β-gona-1,3,5(10),8(9)-tetraen-17-one.

EXAMPLE 21

The substitution of an equivalent quantity of *dl*-3-ethoxy-13β-ethyl-16-oxagona-1,3,5(10),8(9)-tetraen - 17-one in the procedure of Example 9 results in *dl*-3-ethoxy-13β-ethyl-16-oxagona-1,3,5(10),8(9)-tetraen-17-ol.

EXAMPLE 22

When an equivalent quantity of *dl*-3-ethoxy-13β-ethyl-16-oxagona-1,3,5(10),8(9)-tetraen-17-ol is substituted in the procedure of Example 10, there is obtained *dl*-3-ethoxy-13β-ethyl-16-oxagona-1,3,5(10),8(9)-tetraen - 17-ol 17-methyl ether.

EXAMPLE 23

The substitution of an equivalent quantity of *dl*-3-ethoxy-13β-ethyl-16-oxagona-1,3,5(10),8(9)-tetraen - 17-ol 17-methyl ether in the procedure of Example 5 results in *dl*-3-ethoxy-13β-ethyl-16-oxagona-1,3,5(10)-trien-17-ol 17-methyl ether.

EXAMPLE 24

When an equivalent quantity of *dl*-3-ethoxy-13β-ethyl-16-oxagona-1,3,5(10)-trien-17-ol 17-methyl ether is substituted in the procedure of Example 12, there is produced *dl*-3-ethoxy-13β-ethyl-16-oxagona-1,3,5(10)-trien - 17 - ol.

EXAMPLE 25

The substitution of an equivalent quantity of *dl*-3-methoxy-16-oxaestra-1,3,5(10)-trien-17-one in the procedure of Example 9 results in *dl*-3-methoxy-16-oxaestra-1,3,5(10)-trien-17-ol which, after recrystallization from acetone, melts at about 148–149° and is identical with the product of Example 12.

What is claimed is:

1. The process which comprises contacting a 6-(lower alkoxy)-1-vinyl-1-tetralol with a 2-(lower alkyl)-4- oxacyclopentane-1,3-dione, heating the resulting 2 - (lower alkyl)-2-[(6-lower alkoxy)-1-naphthyliden]ethyl - 4-oxacyclopentane-1,3-dione with an acidic reagent, contacting the resulting 3-(lower alkoxy)-13β-(lower alkyl)-16-oxagona-1,3,5(10),8(9),14-pentaen-17-one with hydrogen in the presence of a hydrogenation catalyst, contacting the resulting 3-(lower alkoxy)-13β-(lower alkyl)-16-oxagona-1,3,5(10),8(9)-tetraen-17-one with an alkali metal hydroxide or suitable weak acid salt, contacting the resulting alkali metal salt of a *trans*-2-carboxy-1-hydroxymethyl-2-(lower alkyl)-1,2,3,4,9,10-hexahydrophenanthren-7-ol 7-(lower alkyl) ether or the corresponding free acid with an alkali metal and liquid ammonia, and acidifying the resulting alkali metal salt to afford a *trans*-2-carboxy-1-hydroxymethyl-2-(lower alkyl)-1,2,3,4,4a,9,10,10a-octahydrophenanthren-7-ol 7-(lower alkyl) ether.

2. As in claim 1, the process which comprises contacting 6-methoxy-1-vinyl-1-tetralol with 2-methyl-4-oxacyclopentane-1,3-dione, heating the resulting 2-methyl-2-(6-methoxy - 1 - naphthyliden)ethyl-4-oxacyclopentane-1,3-dione with an acidic reagent, contacting the resulting 3-methoxy-16-oxaestra-1,3,5(10),8(9),14 - pentaen-17-one with hydrogen in the presence of a hydrogenation catalyst, contacting the resulting 3-methoxy-16-oxaestra-1,3,5(10),8(9)-tetraen-17-one with an alkali metal hydroxide or suitable weak acid salt, contacting the resulting alkali metal salt of *trans*-2-carboxy-1-hydroxymethyl-2-methyl-1,2,3,4,9,10-hexahydrophenanthren-7-ol 7-methyl ether or the corresponding free acid with an alkali metal and liquid ammonia and acidifying the resulting alkali metal salt to afford *trans*-2-carboxy-1-hydroxymethyl-2-methyl-1,2,3,4,4a,9,10,10a-octahydrophenanthren - 7 - ol 7 - methyl ether.

3. The process which comprises contacting a 3-(lower alkoxy)-13β-(lower alkyl)-16-oxagona-1,3,5(10),8(9),14-pentaen-17-one with an alkali metal hydroxide or suitable weak acid salt, contacting the resulting alkali metal salt of a *trans*-2-carboxy-1-formyl-2-(lower alkyl)-1,2,3,4,9,10-hexahydrophenanthren-7-ol 7-(lower alkyl) ether with a suitable reducing agent, contacting the resulting alkali metal salt of a *trans*-2-carboxy-1-hydroxy-methyl-2 - (lower alkyl)-1,2,3,4,9,10-hexahydrophenanthren-7-ol 7-(lower alkyl) ether or the corresponding free acid with an alkali metal and liquid ammonia and acidifying the resulting alkali metal salt to afford a *trans*-2-carboxy-1-hydroxymethyl-2-(lower alkyl)-1,2,3,4,4a,9,10,10a - octahydrophenanthren-7-ol 7-(lower alkyl) ether.

4. As in claim 3, the process which comprises contacting 3-methoxy-16-oxaestra-1,3,5(10),8(9),14-pentaen-17-one with an alkali metal hydroxide or suitable weak acid salt, contacting the resulting alkali metal salt of *trans*-2-carboxy-1-formyl - 2 - methyl - 1,2,3,4,9,10 - hexahydrophenanthren-7-ol 7-methyl ether with a suitable reducing agent, contacting the resulting alkali metal salt of *trans*-2-carboxy-1-hydroxymethyl - 2 - methyl - 1,2,3,4,9, 10-hexahydrophenanthren-7-ol 7-methyl ether or the corresponding free acid with an alkali metal and liquid ammonia and acidifying the resulting alkali metal salt to afford *trans*-2-carboxy - 1 - hydroxymethyl - 2 - methyl-1,2,3,4,4a,9,10,10a - octahydrophenanthren-7-ol 7-methyl ether.

5. A compound of the formula

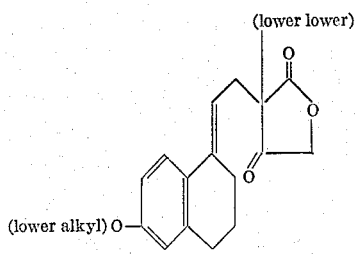

6. As in claim 5, the compound which is 2-methyl-2-(6-methoxy-1-naphthyliden)ethyl - 4 - oxacyclopentane-1, 3-dione.

7. A compound of the formula

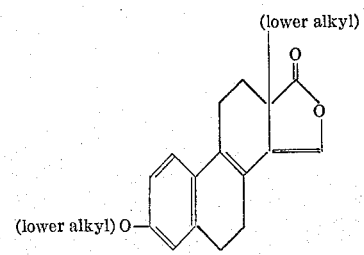

8. As in claim 7, the compound which is *dl*-3-methoxy-16-oxaestra-1,3,5(10),8(9),14-pentaen-17-one.

9. A compound of the formula

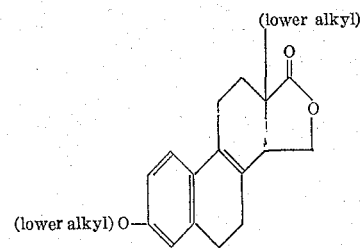

10. As in claim 9, the compound which is *dl*-3-methoxy-16-oxaestra-1,3,5(10),8(9)-tetraen-17-one.

11. A compound of the formula

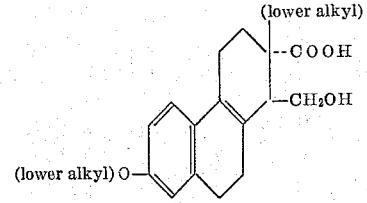

12. As in claim 11, the compound which is *dl-trans*-2-carboxy - 1 - hydroxymethyl-2-methyl-1,2,3,4,9,10-hexahydrophenanthren-7-ol 7-methyl ether.

13. A compound of the formula

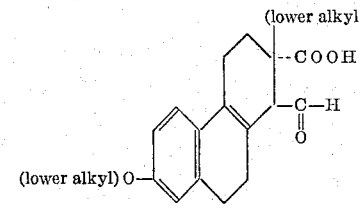

14. As in claim 13, the compound which is *dl-trans*-2-carboxy - 1 - formyl - 2 - methyl-1,2,3,4,9,10-hexahydrophenanthren-7-ol 7-methyl ether.

References Cited by the Examiner

Wieland et al.; Helv. Chim. Acta., 31, 229–232, (1948).

ALEX MAZEL, *Primary Examiner.*

JOSEPH A. NARCAVAGE, *Assistant Examiner.*